(12) United States Patent
Steadings et al.

(10) Patent No.: US 8,727,681 B2
(45) Date of Patent: *May 20, 2014

(54) LOCKING CHUCK

(71) Applicant: Apex Brands, Inc., Sparks, MD (US)

(72) Inventors: Stephen Wayne Steadings, Seneca, SC (US); William C. Buck, Clemson, SC (US); Christopher B. Barton, Seneca, SC (US)

(73) Assignee: Apex Brands, Inc., Sparks, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/762,770

(22) Filed: Feb. 8, 2013

(65) Prior Publication Data

US 2013/0147132 A1    Jun. 13, 2013

Related U.S. Application Data

(63) Continuation of application No. 13/179,880, filed on Jul. 11, 2011, now Pat. No. 8,371,779, which is a continuation of application No. 12/753,219, filed on Apr. 2, 2010, now Pat. No. 7,976,253, which is a continuation of application No. 11/811,683, filed on Jun. 12, 2007, now Pat. No. 7,690,871, which is a continuation of application No. 11/371,798, filed on Mar. 9, 2006, now Pat. No. 7,237,988, which is a continuation of application No. 10/988,045, filed on Nov. 12, 2004, now Pat. No. 7,128,503, which is a continuation of application No. 10/167,708, filed on Jun. 11, 2002, now Pat. No. 6,832,764, which is a continuation of application No. 09/736,762, filed on Dec. 13, 2000, now Pat. No. 6,435,521, which is a continuation of application No. 09/593,726, filed on Jun. 13, 2000, now Pat. No. 6,179,301, which is a continuation of application No. 09/092,552, filed on Jun. 5, 1998, now Pat. No. 6,073,939.

(51) Int. Cl.
*B23B 31/12* (2006.01)

(52) U.S. Cl.
USPC ............................................. 408/240; 279/62

(58) Field of Classification Search
USPC .............................. 408/240; 279/60–62, 902
See application file for complete search history.

(56) References Cited

U.S. PATENT DOCUMENTS

| | | | |
|---|---|---|---|
| 1,985,242 | A | 12/1934 | DeBack |
| 2,458,824 | A | 1/1949 | Axelsson |

(Continued)

FOREIGN PATENT DOCUMENTS

| | | | |
|---|---|---|---|
| DE | 4445858 | A1 | 6/1996 |
| DE | 19606795 | C2 | 1/1998 |

(Continued)

*Primary Examiner* — Daniel Howell
(74) *Attorney, Agent, or Firm* — Nelson Mullins Riley & Scarborough, LLP

(57) ABSTRACT

A chuck including a body having a tail section defining an annular shoulder and a nose section having an axial bore and angularly disposed passageways intersecting the axial bore. An O-ring is disposed in the annular shoulder and a plurality of jaws is slidably positioned in the passageways. A nut is rotatably mounted on the body in engagement with threads on the jaws. A first sleeve and a second sleeve each define a gripping surface thereon and one of the first and second sleeves is axially reciprocal on the body. The one of the first and second sleeves defines an annular groove on an inner surface thereof having a first shoulder and a second shoulder. The O-ring is received in the groove such that axial motion of the one of the first and the second sleeve is limited by abutment of the O-ring with said first and second shoulders.

9 Claims, 12 Drawing Sheets

(56) References Cited

U.S. PATENT DOCUMENTS

| | | |
|---|---|---|
| 2,684,856 A | 7/1954 | Stoner |
| 2,716,555 A | 8/1955 | Rowe |
| 3,237,955 A | 3/1966 | McCarthy et al. |
| 3,325,166 A | 6/1967 | McCarthy et al. |
| 3,506,277 A | 4/1970 | Harms |
| 3,545,776 A | 12/1970 | Haviland |
| 3,788,658 A | 1/1974 | Benjamin et al. |
| 4,272,087 A | 6/1981 | Rohm |
| 4,277,074 A | 7/1981 | Kilberis |
| 4,317,578 A | 3/1982 | Welch |
| 4,323,324 A | 4/1982 | Eberhardt |
| 4,358,230 A | 11/1982 | Rohlin |
| 4,389,146 A | 6/1983 | Coder |
| 4,395,170 A | 7/1983 | Clarey |
| 4,460,296 A | 7/1984 | Sivertson, Jr. |
| 4,498,682 A | 2/1985 | Glore |
| 4,526,497 A | 7/1985 | Hatfield |
| 4,536,113 A | 8/1985 | Hatfield |
| 4,563,013 A | 1/1986 | Hunger et al. |
| 4,607,855 A | 8/1986 | Rohm |
| 4,621,820 A | 11/1986 | Rohm |
| 4,627,626 A | 12/1986 | Rohm |
| 4,627,627 A | 12/1986 | Rohm |
| 4,627,628 A | 12/1986 | Rohm |
| 4,655,464 A | 4/1987 | Manschitz et al. |
| 4,669,932 A | 6/1987 | Hartley |
| 4,682,918 A | 7/1987 | Palm |
| 4,695,066 A | 9/1987 | Rohm |
| 4,700,956 A | 10/1987 | Rohm |
| 4,703,941 A | 11/1987 | Rohm |
| 4,703,942 A | 11/1987 | Rohm |
| 4,773,657 A | 9/1988 | Rohm |
| 4,836,563 A | 6/1989 | Rohm |
| 4,840,387 A | 6/1989 | McCarthy |
| 4,844,482 A | 7/1989 | Rohm |
| 4,913,449 A | 4/1990 | Rohm |
| 4,915,555 A | 4/1990 | Smothers |
| 4,930,793 A | 6/1990 | Ando |
| 4,951,955 A | 8/1990 | Sakamaki |
| 4,955,623 A | 9/1990 | Rohm |
| 4,958,840 A | 9/1990 | Palm |
| 4,968,191 A | 11/1990 | Palm |
| 5,009,439 A | 4/1991 | Sakamaki |
| 5,011,343 A | 4/1991 | Saban et al. |
| 5,054,796 A | 10/1991 | Rohm |
| 5,125,673 A | 6/1992 | Huff et al. |
| 5,145,192 A | 9/1992 | Rohm |
| 5,145,193 A | 9/1992 | Rohm |
| 5,171,030 A | 12/1992 | Rohm |
| 5,174,588 A | 12/1992 | Reibetanz et al. |
| 5,183,274 A | 2/1993 | Sakamaki |
| 5,234,223 A | 8/1993 | Sakamaki |
| 5,236,206 A | 8/1993 | Rohm |
| 5,286,041 A | 2/1994 | Rohm |
| 5,348,318 A | 9/1994 | Steadings et al. |
| 5,375,857 A | 12/1994 | Rohm |
| 5,375,858 A | 12/1994 | Rohm |
| 5,464,230 A | 11/1995 | Rohm |
| 5,501,473 A | 3/1996 | Barton et al. |
| 5,503,409 A | 4/1996 | Rohm |
| 5,531,549 A | 7/1996 | Fossella |
| 5,624,125 A | 4/1997 | Rohm |
| 5,709,392 A | 1/1998 | Barton et al. |
| 5,816,582 A | 10/1998 | Steadings et al. |
| 5,833,247 A | 11/1998 | Deuschle et al. |
| 5,934,690 A | 8/1999 | Lin |
| 5,944,328 A | 8/1999 | Lin et al. |
| 5,988,653 A | 11/1999 | Kuo |
| 5,992,859 A | 11/1999 | Lin |
| 6,073,939 A | 6/2000 | Steadings et al. |
| 6,179,301 B1 | 1/2001 | Steadings et al. |
| 6,241,259 B1 | 6/2001 | Gaddis et al. |
| 6,247,706 B1 | 6/2001 | Kuo |
| 6,257,596 B1 | 7/2001 | Yang |
| 6,435,521 B2 | 8/2002 | Steadings et al. |
| 6,488,287 B2 | 12/2002 | Gaddis et al. |
| 6,832,764 B2 | 12/2004 | Steadings et al. |
| 7,128,503 B2 | 10/2006 | Steadings et al. |
| 7,237,988 B2 | 7/2007 | Steadings et al. |
| 7,690,871 B2 | 4/2010 | Steadings et al. |
| 7,976,253 B2 | 7/2011 | Steadings et al. |
| 8,371,779 B2 * | 2/2013 | Steadings et al. ............. 408/240 |

FOREIGN PATENT DOCUMENTS

| | | |
|---|---|---|
| DE | 19710565 C1 | 6/1998 |
| DE | 29813077 U1 | 11/1998 |
| FR | 2645056 A1 | 3/1989 |

* cited by examiner

LOCKING CHUCK

CLAIM OF PRIORITY

This application is a continuation of U.S. patent application Ser. No. 13/179,880 filed Jul. 11, 2011 (now U.S. Pat. No. 8,371,779), which is a continuation of U.S. patent application Ser. No. 12/753,219 filed Apr. 2, 2010 (now U.S. Pat. No. 7,976,253), which is a continuation of U.S. patent application Ser. No. 11/811,683 filed Jun. 12, 2007 (now U.S. Pat. No. 7,690,871), which is a continuation of U.S. patent application Ser. No. 11/371,798 filed Mar. 9, 2006 (now abandoned U.S. Pat. No. 7,237,988), which is a continuation of U.S. patent application Ser. No. 10/988,045 filed on Nov. 12, 2004 (now U.S. Pat. No. 7,128,503), which is a continuation of U.S. patent application Ser. No. 10/167,708 filed Jun. 11, 2002 (now U.S. Pat. No. 6,832,764), which is a continuation of U.S. patent application Ser. No. 09/736,762 filed Dec. 12, 2000 (now abandoned U.S. Pat. No. 6,435,521), which is a continuation of U.S. patent application Ser. No. 09/593,726 filed Jun. 13, 2000 (now abandoned U.S. Pat. No. 6,179,301), which is a continuation of U.S. patent application Ser. No. 09/092,552 filed Jun. 5, 1998 (now U.S. Pat. No. 6,073,939), the entire disclosure which is incorporated by reference herein.

BACKGROUND OF THE INVENTION

The present invention relates generally to chucks for use with drills or with electric or pneumatic power drivers. More particularly, the present invention relates to a chuck of the keyless type which may be tightened or loosened by hand.

Both hand and electrical or pneumatic tool drivers are well known. Although twist drills are the most common tools on such drivers, the tools may also comprise screw drivers, nut drivers, burrs, mounted grinding stones, and other cutting or abrading tools. Since the tool shank may be of varying diameter or of polygonal cross section, the device is usually provided with a chuck that is adjustable over a relatively wide range. The chuck may be attached to the driver by a threaded or tapered bore or any other suitable means.

A variety of chuck types have been developed that are actuated by relative rotation between a chuck body and an annular nut. In a typical oblique jawed chuck, for example, a body member includes three passageways disposed approximately 120° apart from each other. The passageways are configured so that their center lines meet at a point along the chuck axis forward of the chuck body. Three jaws are constrained by and movable in the passageways to grip a cylindrical tool shank disposed approximately along the chuck center axis. The nut rotates about the chuck's center and engages threads on the jaws so that rotation of the nut moves the jaws in either direction in the passageways. The body and nut are configured so that rotation of the nut in one direction (the closing direction) with respect to the body forces the jaws into gripping relationship with the tool shank, while rotation in the opposite direction (the opening direction) releases the gripping relationship. Such a chuck may be keyless if it is rotated by hand. Examples of such chucks are disclosed in U.S. Pat. Nos. 5,125,673 and 5,193,824, commonly assigned to the present assignee and the entire disclosure of each of which is incorporated by reference herein. Various configurations of keyless chucks are known in the art and are desirable for a variety of applications.

Keyless chucks actuated by relative rotation between a nut and a chuck body include means to control the rotational position of the nut and the body. For example, a first sleeve may be provided in communication with the nut while a second sleeve, which is independent of the first sleeve, may be attached to the body. Thus, a user may rotate the first sleeve with one hand while gripping the second sleeve with the other hand, thereby holding the body still. Alternatively, in some devices in which only a single sleeve is provided, a user may grip the single sleeve and actuate the tool driver to rotate the spindle, thereby rotating the chuck body with respect to the sleeve. In addition, a mechanism may be located in a driver to lock the spindle of the driver when the driver is not actuated, thus enabling use of a single sleeve chuck.

SUMMARY OF THE INVENTION

The present invention recognizes and addresses the foregoing considerations, and others, of prior art constructions and methods.

Accordingly, it is an object of the present invention to provide an improved chuck.

It is a further object of the present invention to provide an improved drill.

It is a still further object of the present invention to provide a chuck having an improved mechanism for loosening and tightening the chuck.

One embodiment provides a chuck for use with a manual or powered driver having a housing and a rotatable drive shaft extending therefrom, the chuck including a generally cylindrical body having a nose section and a tail section, the tail section defining an annular shoulder and configured to mate with the drive shaft so that the body rotates with the drive shaft and the nose section having an axial bore formed therein and a plurality of angularly disposed passageways formed therethrough and intersecting the axial bore. An O-ring is disposed in the annular shoulder of the tail section and a plurality of jaws is slidably positioned in each of the angularly disposed passageways, each of the jaws having a jaw face formed on one side thereof and threads formed on the opposite side thereof. A nut is rotatably mounted on the body in engagement with the threads on the jaws so that rotation of the nut moves the jaws axially within the passageways. Each of a first sleeve and a second sleeve defines a gripping surface thereon, wherein, in a first state, the first sleeve is rotationally held to the body and the second sleeve is rotationally held to the nut and is rotatable with respect to the housing and with respect to the body. One of the first sleeve and the second sleeve is axially reciprocal between the first state and a second state in which the one of the first sleeve and the second sleeve is rotationally held to the nut and the housing and is rotatable with respect to the body. One of the first sleeve and the second sleeve defines an annular groove on an inner surface thereof, an axial length of the annular groove being defined by a first shoulder and a second shoulder. The O-ring is received in the groove such that axial motion of the one of the first sleeve and the second sleeve is limited by abutment of the O-ring with the first and the second shoulders of the axial groove.

Other objects, features and aspects of the present invention are discussed in greater detail below.

BRIEF DESCRIPTION OF THE DRAWINGS

A full an enabling disclosure of the present invention, including the best mode thereof to one of ordinary skill in the art, is set forth more particularly in the remainder of the specification, which makes reference to the accompanying figures, in which.

Figure 1:
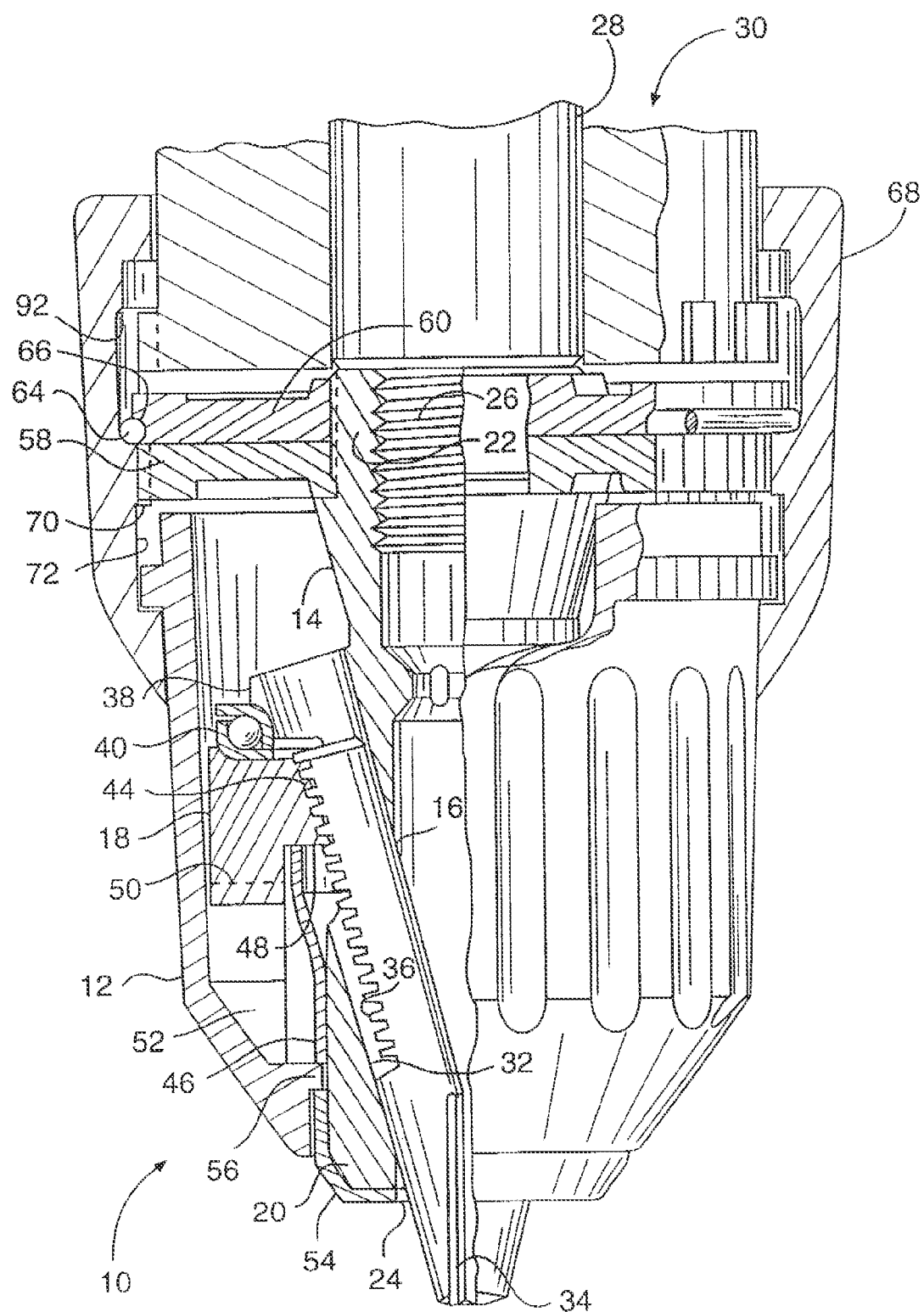
FIG. 1 is a longitudinal view, partly in section, of a chuck in accordance with an embodiment of the present invention.

Repeat use of reference characters in the present specification and drawings is intended to represent the same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

In the embodiments illustrated in the figures, a drill chuck has a body configured for attachment to a drill spindle and having passages in which jaws are held. The jaws reciprocally move (in either an opening or closing direction) by a threadedly engaged nut. In these embodiments, a locking member in the form of a generally cylindrical sleeve is axially moveable to either of two positions. In the first position, the sleeve rotates with respect to the drill housing. In the second position, it is rotationally held to the housing and to the nut. That is, the locking sleeve does not rotate with respect to the housing or to the nut in the embodiment shown in FIGS. 1-4, the locking sleeve remains in the second position throughout opening and closing of the chuck once the operator moves the locking sleeve into the appropriate position. In the embodiments shown in FIGS. 6A-9, however, the locking sleeve is held to the nut through a clutch mechanism that rotationally locks the sleeve and housing to the nut as long the clutch mechanism or nut does not substantially resist the rotational torque applied by the other component, as is described in more detail below. When the resistance does overcome this torque, the nut teeth and clutch teeth slip over each other, allowing the nut to rotate with the body with respect to the locking sleeve, thereby preventing over tightening. It should be understood, however, that the present invention is not limited to such embodiments.

Referring to FIGS. 1-4, a chuck 10 includes a front sleeve 12, a body 14, jaws 16 and a nut 18. Body 14 is generally cylindrical in shape and comprises a nose or forward section 20 and a tail or rearward section 22. An axial bore 24 is formed in nose section 20. Axial bore 24 is dimensioned somewhat larger than the largest tool shank that the chuck is designed to accommodate. A threaded bore 26 is formed in tail section 22 and is of a standard size to mate with a drive shaft 28 of a powered or hand driver indicated in part at 30. The bores 24 and 26 may communicate at a central region of body 14. While a threaded bore 26 is illustrated, such bore could be replaced with a tapered bore of a standard size to mate with a tapered drive shaft or with any other suitable connection mechanism.

Passageways 32 are formed in body 14 to accommodate each jaw 16. Three jaws 16 are employed, and each jaw is separated from the adjacent jaw by an arc of approximately 120°. The axes of the passageways 32 and the jaws 16 are angled with respect to the chuck axis and intersect the chuck axis at a common point ahead of chuck body 14. Each jaw 16 has a tool engaging portion 34, which is generally parallel to the axis of chuck body 14, and threads 36 on its opposite or outer surface. Threads 36 may be constructed in any suitable type and pitch.

Body 14 includes a thrust ring member 38 which, in a preferred embodiment, may be integral with the body. In an alternate embodiment, thrust ring 38 may be a separate component from the body member. Thrust ring 38 may also include a ledge portion to receive a bearing assembly 40. Thrust ring 38 includes a plurality of jaw guideways 42 formed around its circumference to permit retraction of the jaws 16 therethrough.

Nut 18 is a one piece nut which includes threads 44 for mating with threads 36 on jaws 16. Nut 18 is positioned about the body in engagement with the jaw threads so that when the nut is rotated with respect to body 14, the jaws will be advanced or retracted. A nut retainer 46 is pressed to nose section 20 of body 14 and engages nut 18 at a forward ledge 48 thereof. Thus, retainer 46 secures nut 18 in the axial direction with respect to the body.

Nut 18 also includes a plurality of notches 50 receiving drive dogs 52 of front sleeve 12 by which front sleeve 12 and nut 18 are rotationally held to each other. A nose piece 54 is pressed to forward section 20 of body 14 and retains front sleeve 12 in the axially forward direction by an annular lip 56 of sleeve 12.

The outer circumferential surface of sleeve 12 may be knurled or may be provided with longitudinal ribs or any other configuration to enable a user to grip it securely. The sleeve may be fabricated from a structural plastic such as polycarbonate, a filled polypropylene, for example glass filled plypropylene, or a blend of structural plastic materials. Other composite materials such as, for example, graphite filled polymerics may also be suitable in a given environment. In one embodiment, the sleeve is constructed from a 30% glass filled nylon 66 material. As would be appreciated by one skilled in the art, the materials for which the chuck of the present invention is fabricated will depend on the end use of the chuck, and the above are provided by way of example only.

A pair of rear body flanges 58 and 60 are pressed to rear portion 22 of body 14 at knurled portion 62. An O-ring 64 sits in an annular shoulder 66 of rear body flange 60 to limit axial movement of a rear sleeve 68 in both the forward and rearward directions as is discussed below. Although rear body flanges 58 and 60 are illustrated in this embodiment as separate members from body 14, it should be understood that they may be constructed integrally therewith.

Rear sleeve 68 is axially reciprocal with respect to body 14. In the position of rear sleeve 68 shown in FIG. 1, axially aligned teeth 70 extending radially inward from an inner circumferential surface 72 of rear sleeve 68 engage axially aligned teeth 74 (referring also to FIG. 4) extending radially outward from outer circumferential surface 76 of rear body flange 58. Thus, rear sleeve 68 is rotationally held to body 14 through rear body flange 58. O-ring 64 and rear body flange 60 prevent further rearward axial movement of rear sleeve 68. Using this axial rear sleeve position, an operator may operate chuck 10 as a two-sleeve keyless chuck. By gripping rear sleeve 68 and front sleeve 12, the operator holds body 14 and nut 18, respectively. Rotating the sleeves with respect to each other rotates the body and nut with respect to each other, thereby opening or closing the chuck depending upon the direction of relative rotation.

Figure 2:
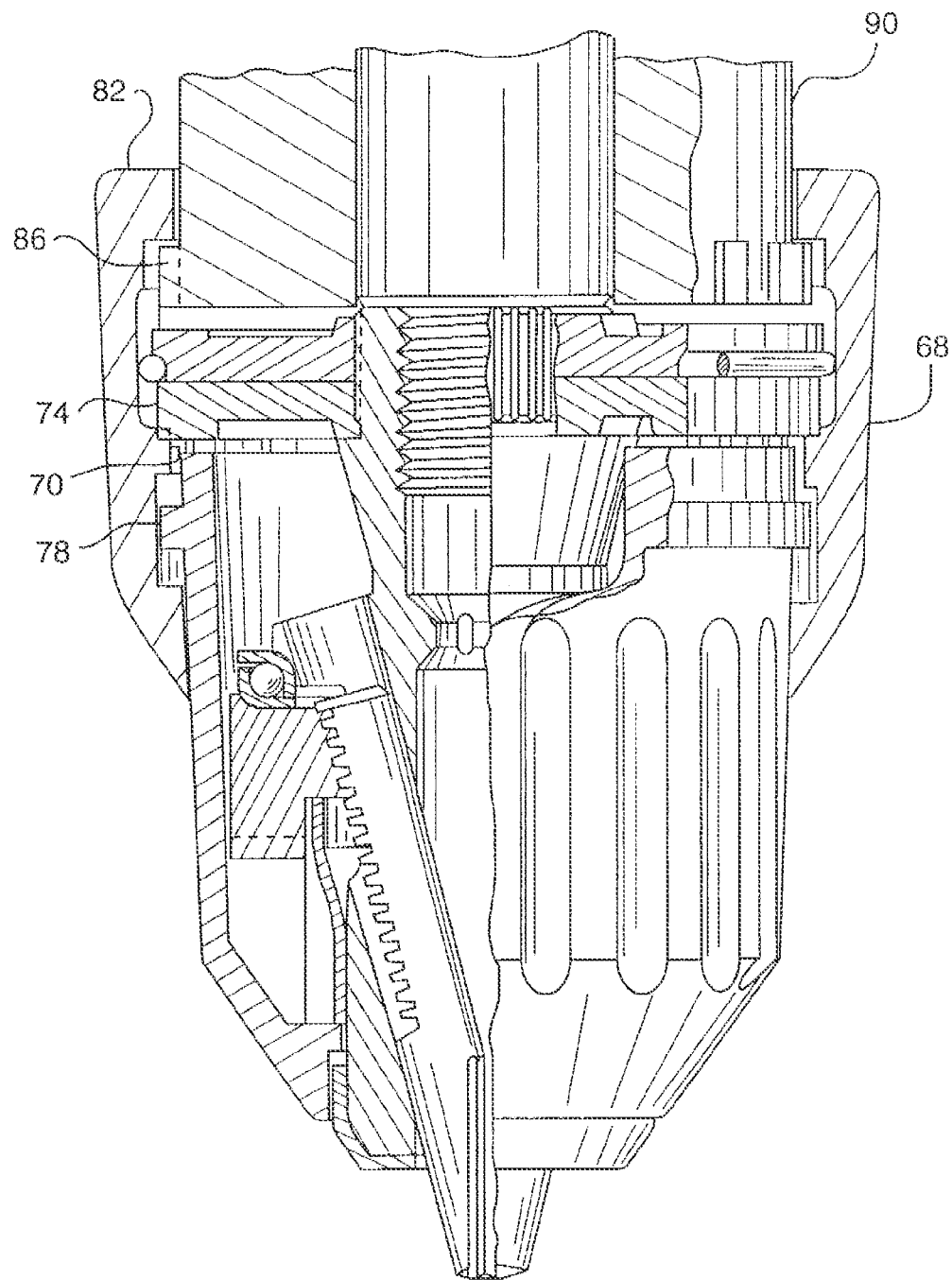
FIG. 2 is a longitudinal view, partly in section, of the chuck as in FIG. 1.

As shown in FIG. 2, however, forward axial movement of rear sleeve 68 disengages teeth 70 from teeth 74, and teeth 70 move toward axially aligned teeth 78 extending radially outward from an outer S circumferential surface 80 of front sleeve 12. Teeth 78 are disposed far enough forward of teeth 74 so that teeth 70 clear teeth 74 before engaging teeth 78. This allows for any slight rotation of sleeve 68 necessary to align teeth 70 with the gaps between teeth 78. It should be understood, however, that teeth 78 may be disposed more closely to teeth 74 so that teeth 70 engage teeth 78 before entirely disengaging teeth 74.

Figure 3:
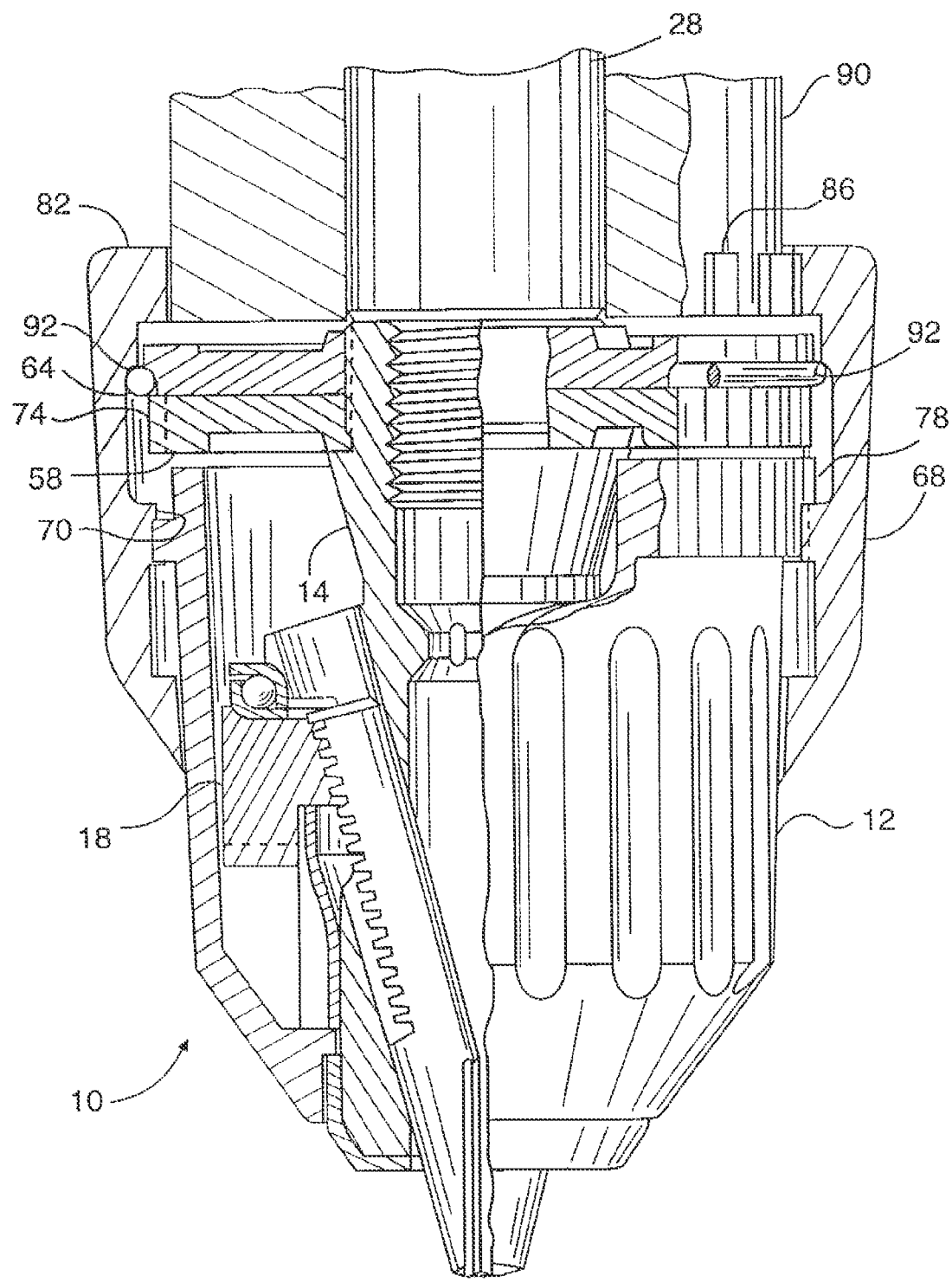
FIG. 3 is a longitudinal view, partly in section, of the chuck as in FIG. 1.
Figure 4:
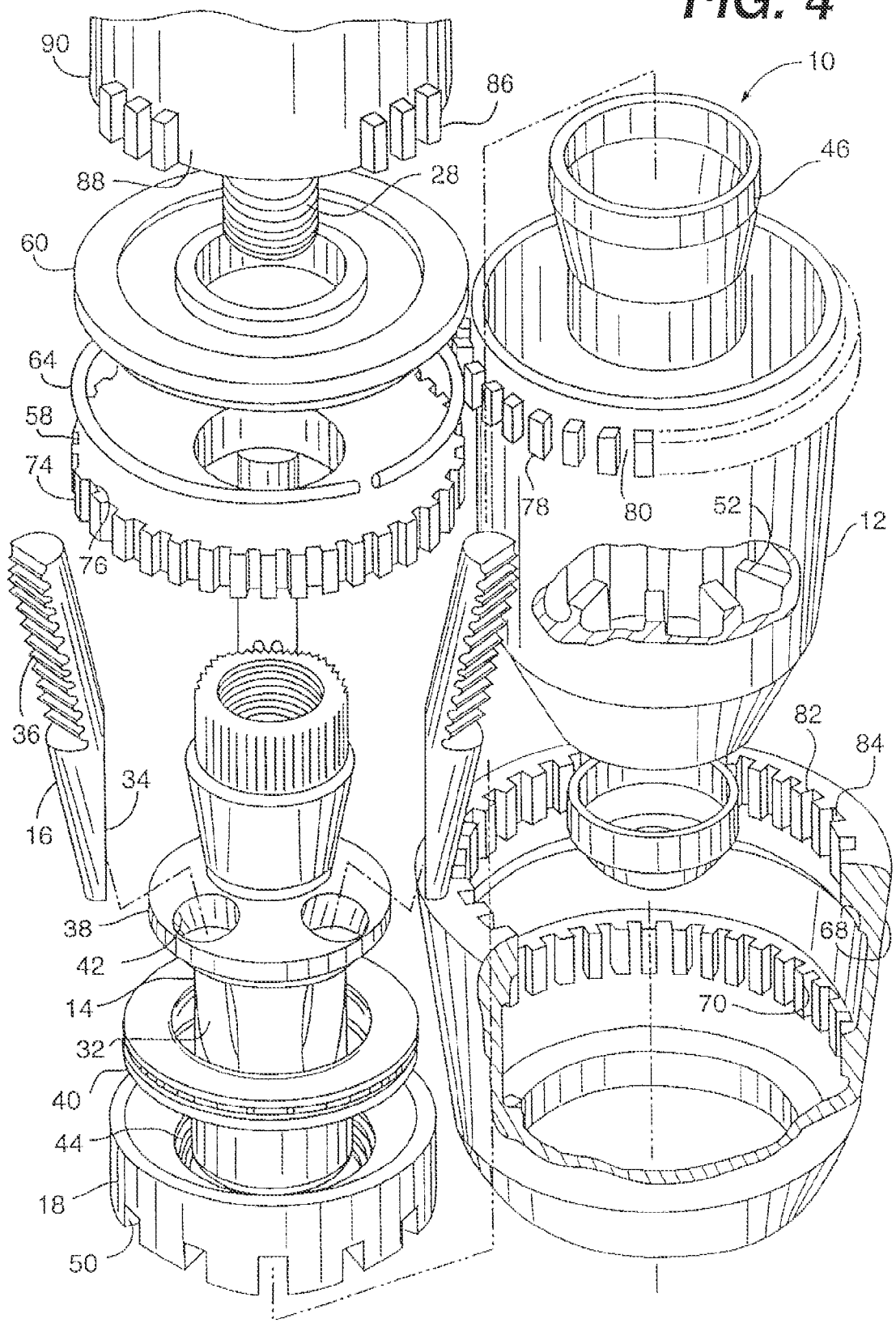
FIG. 4 is an exploded view of the chuck as in FIG. 1.

As teeth 70 engage teeth 78, axially aligned teeth 82, which extend radially inward from inner circumferential surface 84 of rear sleeve 68, engage axially aligned teeth 86, which extend radially outward from an outer circumferential surface 88 of drill housing 90. Referring to FIGS. 3 and 4, in the rear sleeve's axially forward position, rear sleeve teeth 82 and 70 engage teeth 86 and teeth 78 of drill housing 90 and front sleeve 12, respectively. Further forward axial movement of rear sleeve 68 is prevented by O-ring 64, upon which bears shoulder 92 of rear sleeve 68. In this position, teeth 70 have completely disengaged teeth 74 of rear body flange 58.

Accordingly, in the rear sleeve axial position shown in FIG. 3, nut 18 is rotationally held to housing 90 by front sleeve 12 and rear sleeve 68. At the same time, nut 18, front sleeve 12 and rear sleeve 68 are rotatable with respect to body 14, which rotates with spindle 28. Accordingly, activation of drill 30 to rotate spindle 28 rotates body 14 with respect to nut 18, thereby opening or closing chuck 10 depending upon the spindle's rotational direction. Because opening and closing of the chuck with sleeve 68 in this position requires only one of the operator's hands (to operate the drill), the operator may use his other hand to hold a drill bit or other tool being locked into or released from the chuck.

Rear sleeve 68 may have the same or similar construction as front sleeve 12.

Figure 5:
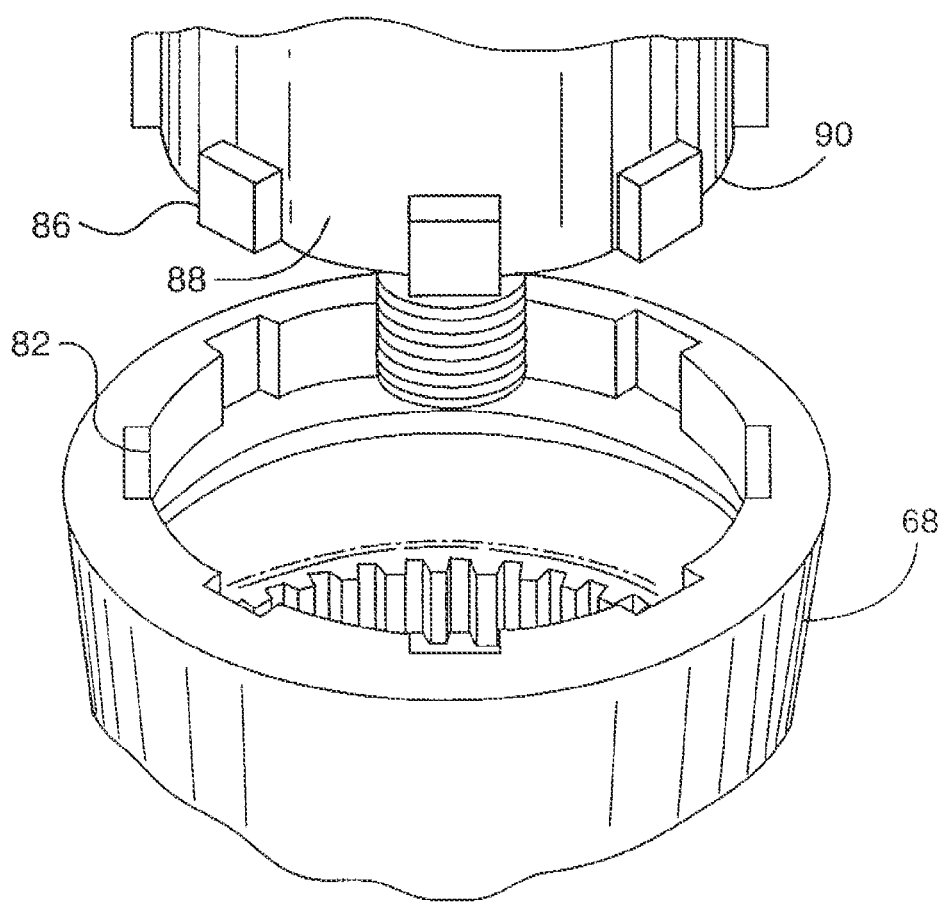
FIG. 5 is a partial exploded view of a chuck in accordance with an embodiment of the present invention.

It should be understood that various suitable locking mechanisms may be used to rotationally hold the rear sleeve to the body, the front sleeve, the housing and/or any other chuck component as appropriate in a given embodiment of the present invention. For example, the teeth 86 as illustrated in FIG. 5 are wider and more spaced apart than the teeth 86 illustrated in FIG. 4. Correspondingly, teeth 82 at the rear of rear sleeve 68 are wider to fill the gaps between teeth 86. In further embodiments, discussed in more detail below, radially extending teeth may be replaced by axially extending teeth. Moreover, it should be understood that any suitable locking mechanism construction and configuration is within the scope and spirit of the present invention.

Figure 6A:
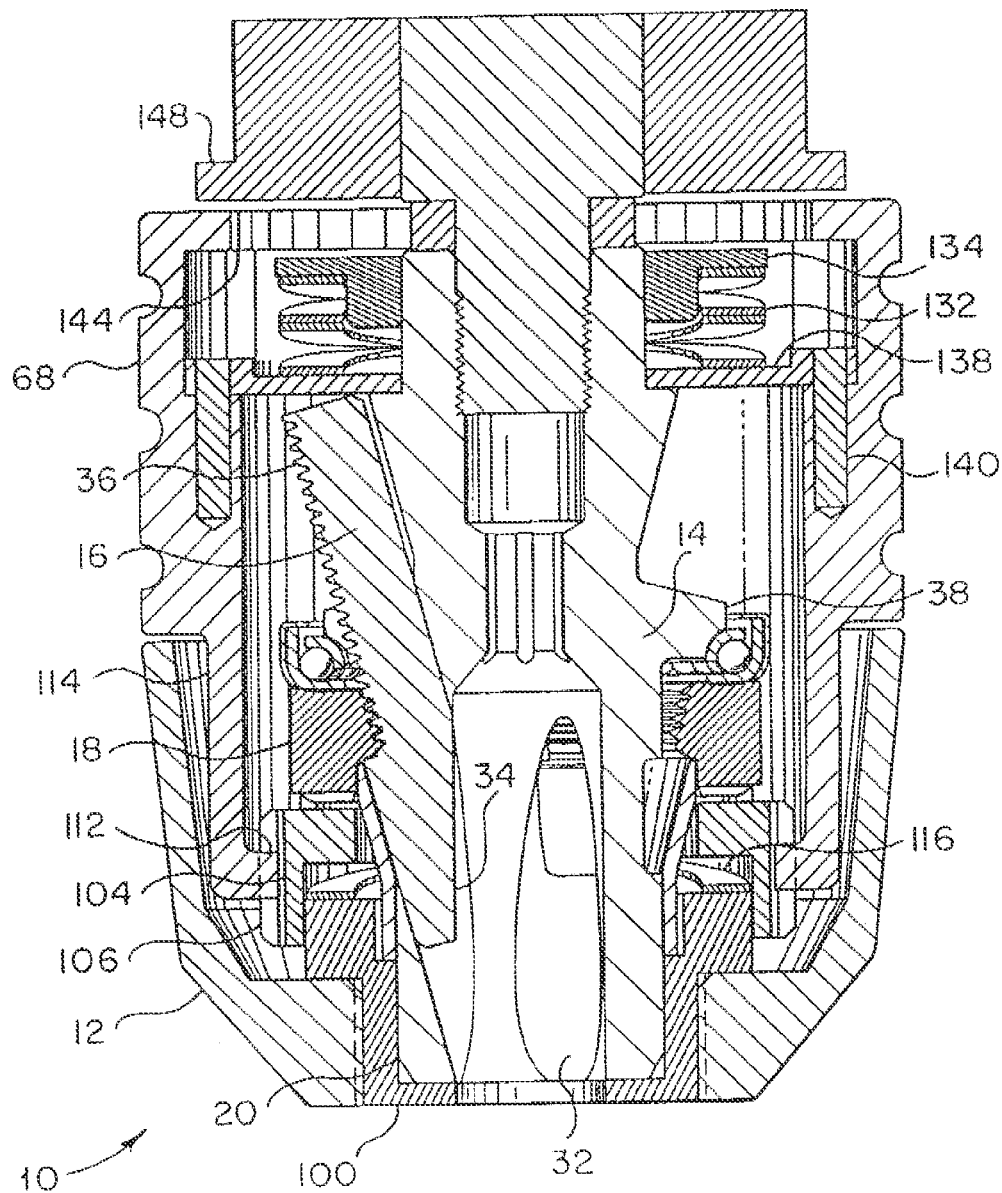
FIG. 6A is a longitudinal view, in cross section, of a chuck in accordance with an embodiment of the present invention.
Figure 6B:
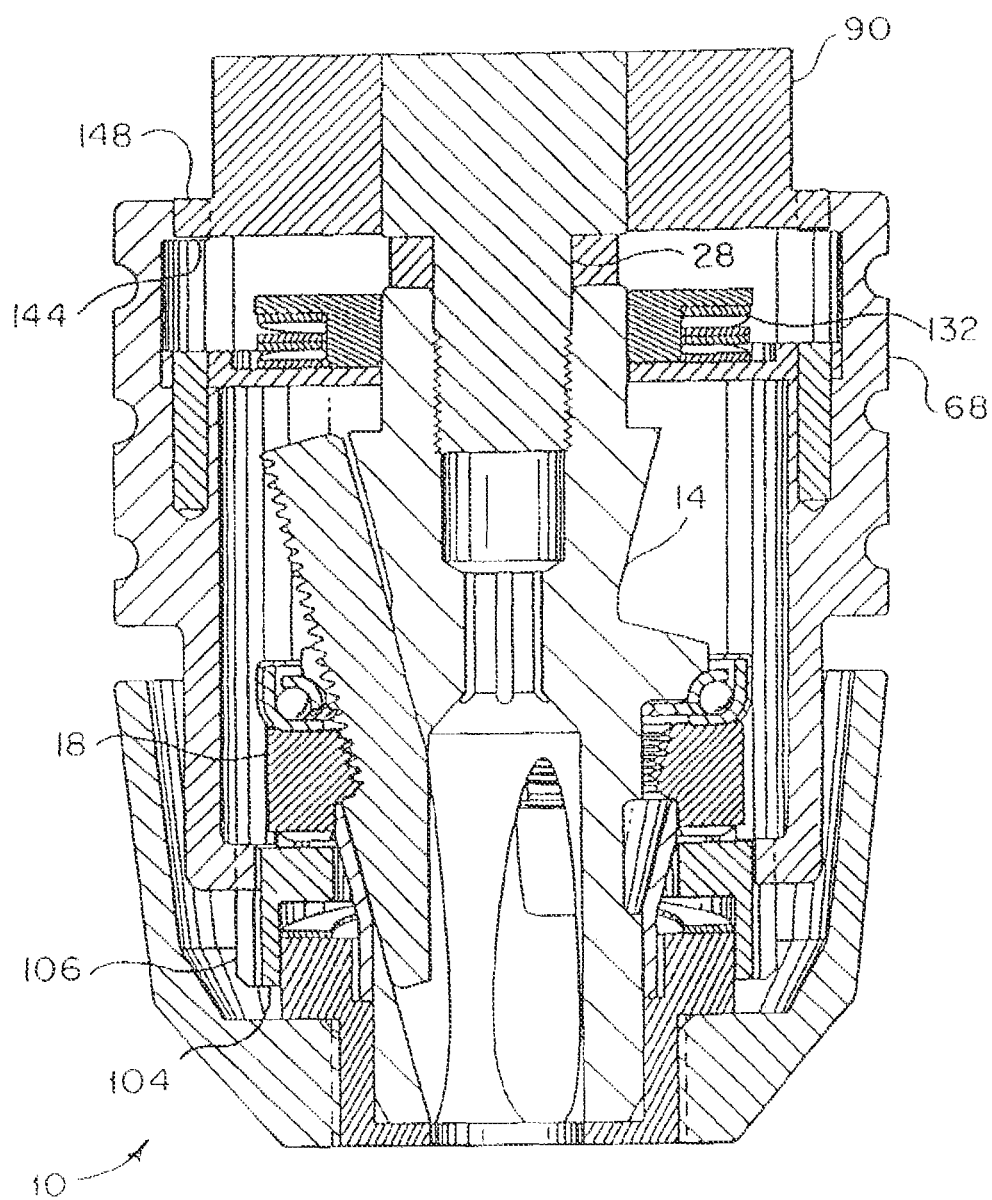
FIG. 6B is a longitudinal view, in cross section, of the chuck as in FIG. 6A.
Figure 9:
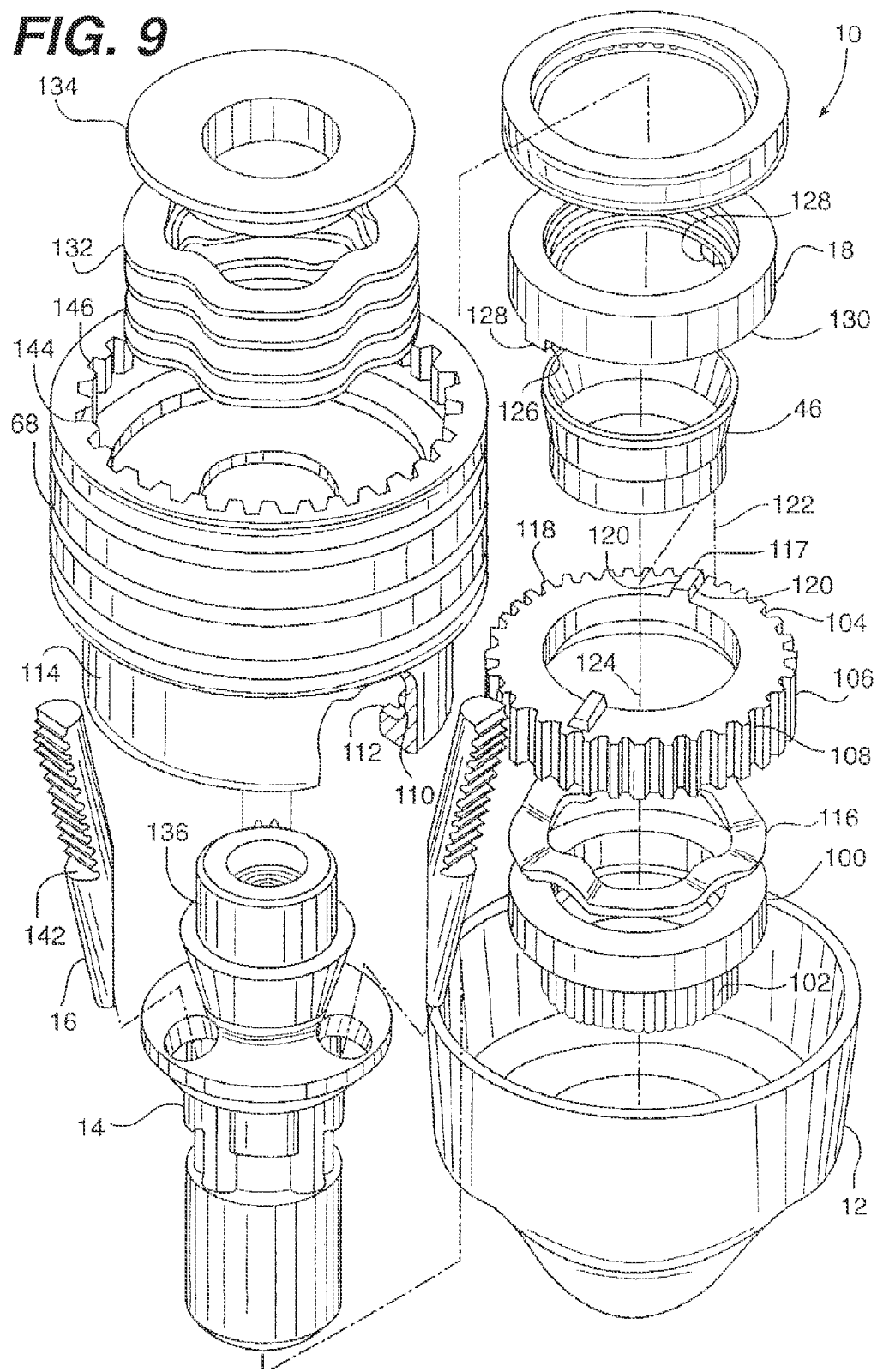
FIG. 9 is an exploded view of the chuck as in FIGS. 6A and 6B.

In the embodiment illustrated in FIGS. 6A, 6B and 9, front sleeve 12 is pressed onto a nose piece 100 at 102. Nose piece 100 is, in turn, pressed onto forward section 20 of body 14. Accordingly, unlike the embodiment illustrated in FIGS. 1-4, front sleeve 12 is rotationally held to body 14 rather than nut 18.

Rear sleeve 68 is rotationally held to nut 18 during normal operation through a clutch mechanism including an annular clutch plate 104. Axially aligned teeth 106 extend radially outward from an outer circumferential surface 108 of clutch plate 104 and are received by grooves 110 between axially aligned teeth 112 extending radially inward from an inner circumferential surface of a forward section 114 of rear sleeve 68. Rear sleeve 68 is axially reciprocal with respect to clutch plate 104 by the interaction between teeth 106 and grooves 110.

Clutch plate 104 is held in position between body 14 and nut 18 by a wave spring 116. Wave spring 116 bears on one side on body 14 through nose piece 100 and on the other side directly on clutch plate 104. Wave spring 116, which may include one or more individual springs, biases clutch plate 104 axially toward nut 18. A lubricant may be provided on one or both sides of wave spring 116 and/or one or both surfaces of clutch ring 104 and nose piece 100 to facilitate relative rotation between the clutch plate and the nose piece.

An engaging surface of clutch plate 104 includes a pair of lugs 117 extending axially forward from annular surface 118 of the engaging surface. Sides 120 of each lug 117 are disposed at an oblique angle with respect to a plane 122 including the chuck axis 124.

One side 120 of each lug 117 abuts an opposing side 126 of a lug 128 extending axially from an annular surface 130 of an engaging surface of nut 18 as nut 18 is rotated with respect to body 14. As with sides 120, sides 126 are disposed at an oblique angle with respect to plane 122.

Rear sleeve 68 is biased forwardly by a wave spring 132, here formed by a plurality of wave springs, bearing on one side on body 14 through a rear body plate 134 pressed onto body 14 at 136 and on the other side on rear sleeve 68 through a rear sleeve flange 138. Although not illustrated in FIG. 9, it should be understood that surface 136 may be knurled to facilitate the press fit between it and rear body plate 134. Furthermore, while rear sleeve flange 138 is illustrated as being attached to rear sleeve 68 by dowels 140, it should be understood that any suitable attachment mechanism may be employed. For example, the rear sleeve flange may be integral with the rear sleeve or may be a separate piece integrally molded with the rear sleeve. One or both sides of spring 132 and/or one or both of the sides of rear body plate 134 and rear sleeve flange 138 on which it directly bears may include a suitable lubricant to facilitate relative rotation between sleeve 68 and body 14.

In its axial position illustrated in FIG. 6A, rear sleeve 68 is rotatable with respect to body 14 and chuck 10 may be operated as a two-sleeve keyless chuck. For example, an operator may grip front sleeve 12 to rotationally secure body 14 and may grip rear sleeve 68 to rotationally secure nut 18, which is rotationally held to sleeve 68 through clutch ring 104 and the interface between lugs 117 and 128. Thus, relative rotation between front sleeve 12 and rear sleeve 68 opens or closes chuck 10 depending upon the direction of relative rotation.

When chuck 10 reaches a fully opened or a fully closed position, further movement of jaws 16 is prevented by the abutment of face 142 of jaws 16 against nut 18 or by the abutment of jaw faces 34 against each other or a tool. Nut 18 then tightens onto threads 36 of jaws 16 and resists further rotation.

Because of the angled interface between sides 126 and 120 of lugs 128 and 117, respectively, part of the rotational force applied by sleeve 68 to nut 18 through clutch ring 104 is translated to an axial force tending to separate the clutch ring and the nut. During normal operation, this force is resisted by the bias of spring 116. Because nut 18 is tightened onto the jaw threads as chuck 10 reaches a fully opened or closed position, however, nut 18 resists the rotational force applied by the clutch plate, and additional rotational force is required to further rotate the nut. When the force applied between sides 126 and 120 creates a separation force exceeding the counter force provided by biasing spring 116, clutch plate 104 is moved axially forward, compressing spring 116. Lugs 117 and 128 thus ride over one another, thereby allowing sleeve 68 to rotate with respect to nut 18 and preventing over tightening of the nut.

The force necessary to cause clutch plate 104 to ride over nut 18 is primarily determined by the strength of spring 116 and the angle of the sides 126 and 120. In one preferred embodiment, spring 116 includes two 22 lb. wave springs, and sides 120 and 126 are disposed at an angle of approximately 60° from surfaces 118 and 130, respectively. It should be understood, however, that the construction and dimensions of these components may be varied as suitable for a given chuck construction.

The chuck illustrated in FIGS. 6A, 6B and 9 may also be opened and closed through operation of the drill spindle. Accordingly, referring to FIGS. 6B and 9, rear sleeve 68 may be pushed axially rearward against the bias of spring 132 so that axially aligned teeth 144 extending radially inward from inner circumferential surface 146 of rear sleeve 68 engage Axially aligned teeth 148 extending radially outward from an outer circumferential surface of drill housing 90. Rear sleeve 68 slides axially rearward with respect to clutch plate 104 but remains rotationally held thereto through the cooperation of grooves 110 and teeth 106. Thus, nut 18 is rotationally held to housing 90 through clutch plate 104 and rear sleeve 68. While holding sleeve 68 in the axially rearward position illustrated in FIG. 6B, an operator may activate the drill to rotate spindle 28, thereby rotating body 14 with respect to nut 18 to open or close chuck 10 depending on the spindle's rotational direction. The clutch mechanism operates as discussed above with respect to FIG. 6A to prevent over tightening, except that rotational force is applied through nut 18 rather than through clutch plate 104.

Figure 7A:
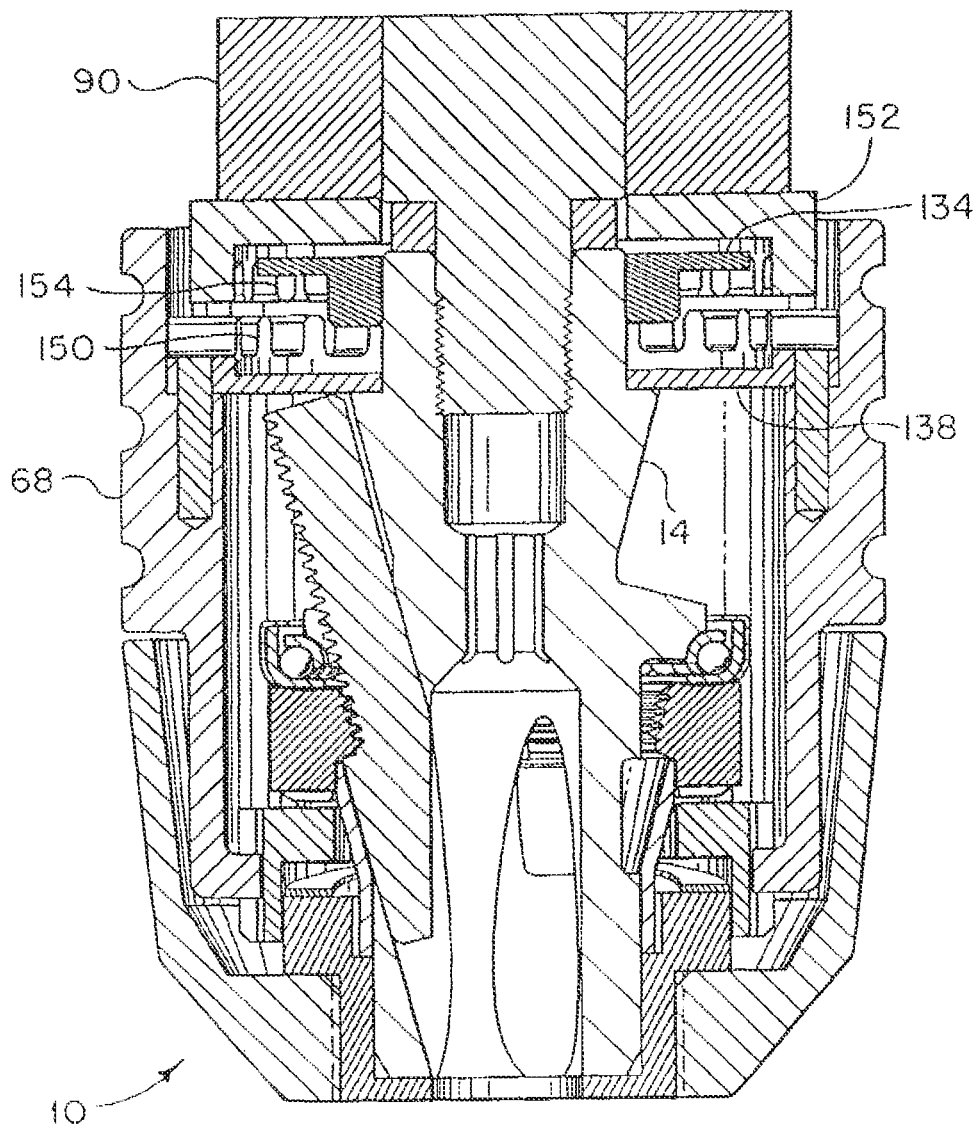
FIG. 7A is a longitudinal view, in cross section, of a chuck in accordance with an embodiment of the present invention.
Figure 7B:
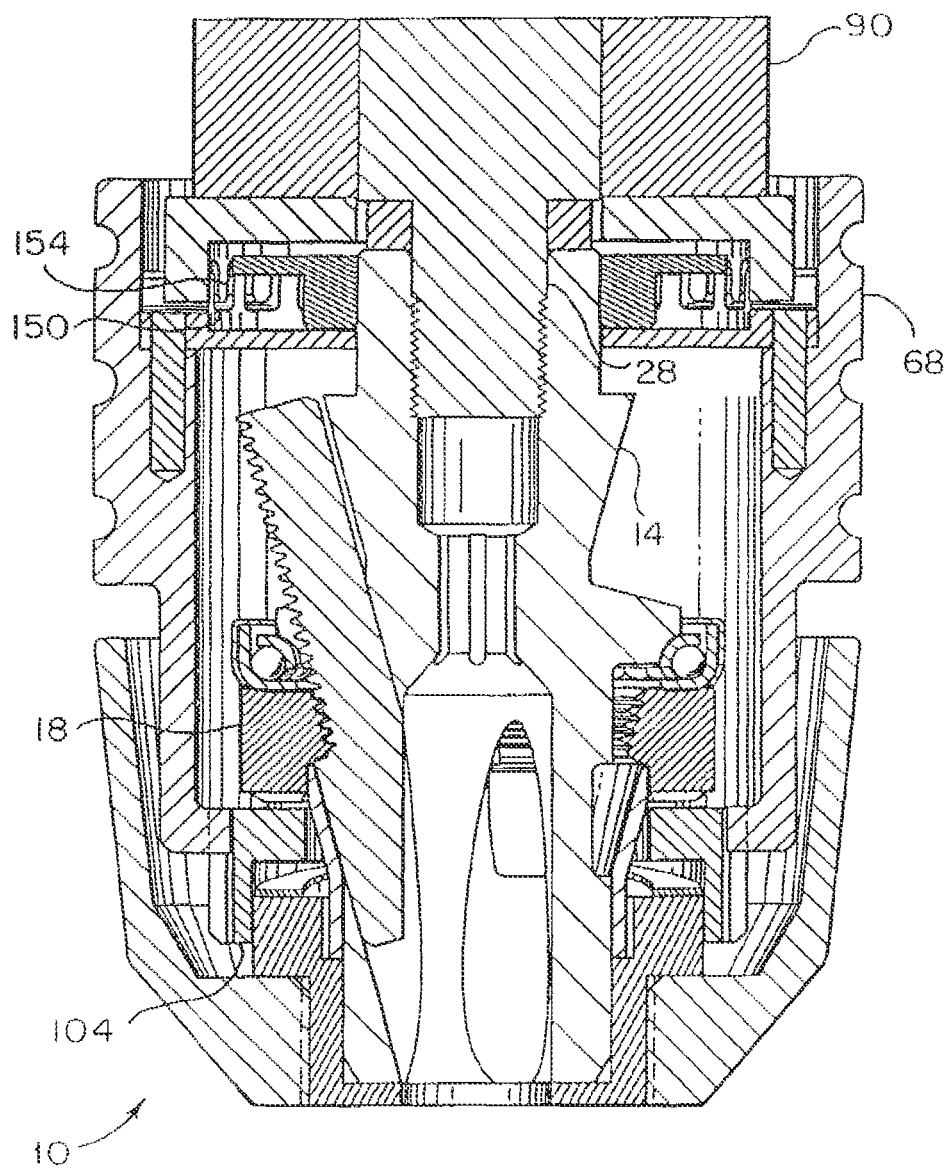
FIG. 7B is a longitudinal view, in cross section of the chuck as in FIG. 7A.

The embodiment illustrated in FIGS. 7A and 7B operate similarly to the embodiment illustrated in FIG. 6A and FIG. 6B, primarily except for the rotational engagement between rear sleeve 68 and housing 90. For purposes of clarity, wave spring 132 (FIGS. 6A and 6B) is not illustrated in FIGS. 7A and 7B. It should be understood, however, that this spring is present in the embodiment illustrated in FIGS. 7A and 7B to perform a function similar to that discussed above. For example, the spring biases rear sleeve 68 forward to the axial position shown in FIG. 7A.

Rather than employing radially extending teeth, rear sleeve flange 138 includes radially aligned teeth 150 extending axially rearward from rear sleeve flange 138. A housing plate 152 includes radially aligned teeth 154 extending axially forward therefrom and opposing teeth 150. In the axial position illustrated in FIG. 7A, rear sleeve 68 is rotatable with respect to body 14 and housing 90, and chuck 10 may be operated as a two-sleeve keyless chuck as described above with respect to FIG. 6A.

As shown in FIG. 7B, rear sleeve 68 may be pulled rearwardly against the biasing spring to engage teeth 150 and 154, thereby rotationally holding sleeve 68 to housing 90. Sleeve 68 slides rearwardly with respect to, but remains rationally held to, clutch plate 104. Thus, nut 18 is rotationally held to housing 90 through clutch plate 104 and rear sleeve 68. Activation of the drill to rotate spindle 28 thus rotates body 14 with respect to nut 18, thereby opening or closing chuck 10 depending upon the spindle's rotational direction.

Figure 8A:
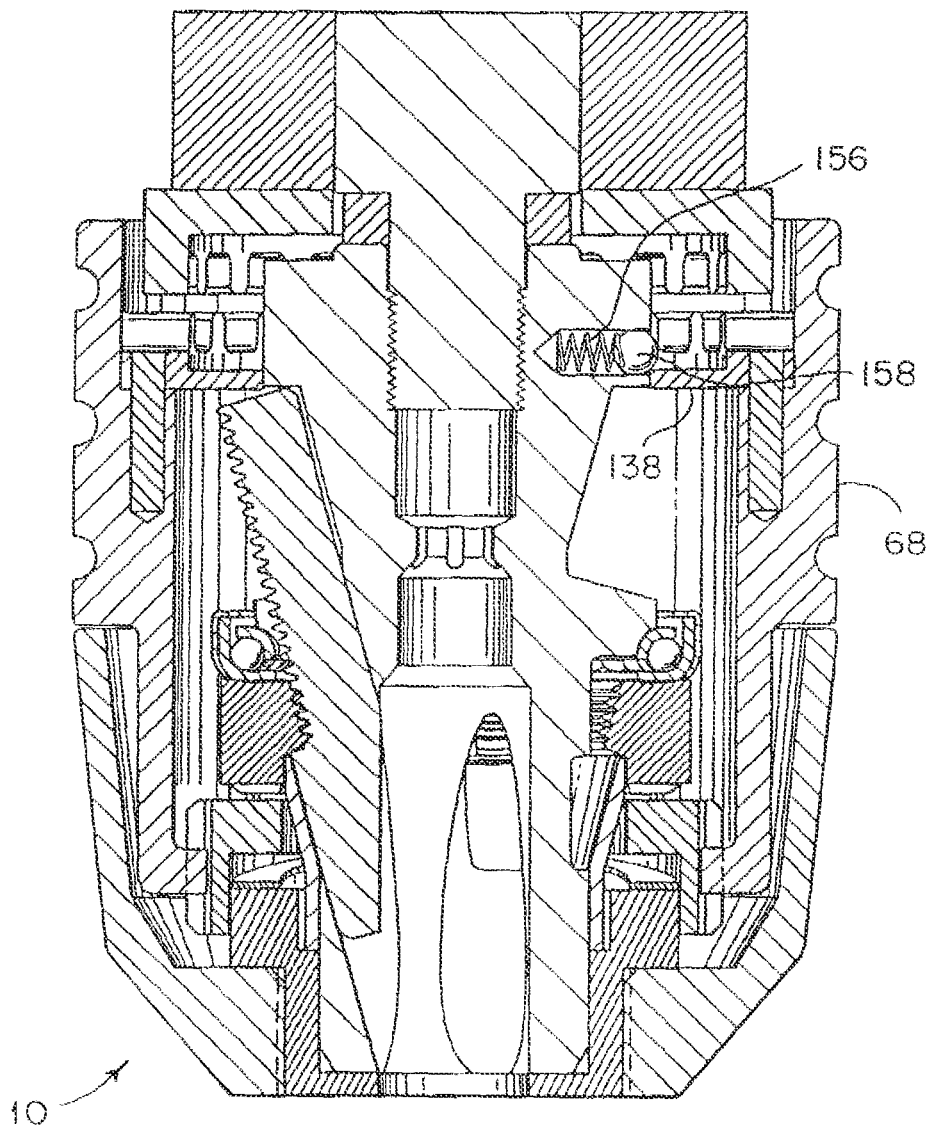
FIG. 8A is a longitudinal view, in cross section, of a chuck in accordance with an embodiment of the present invention.
Figure 8B:
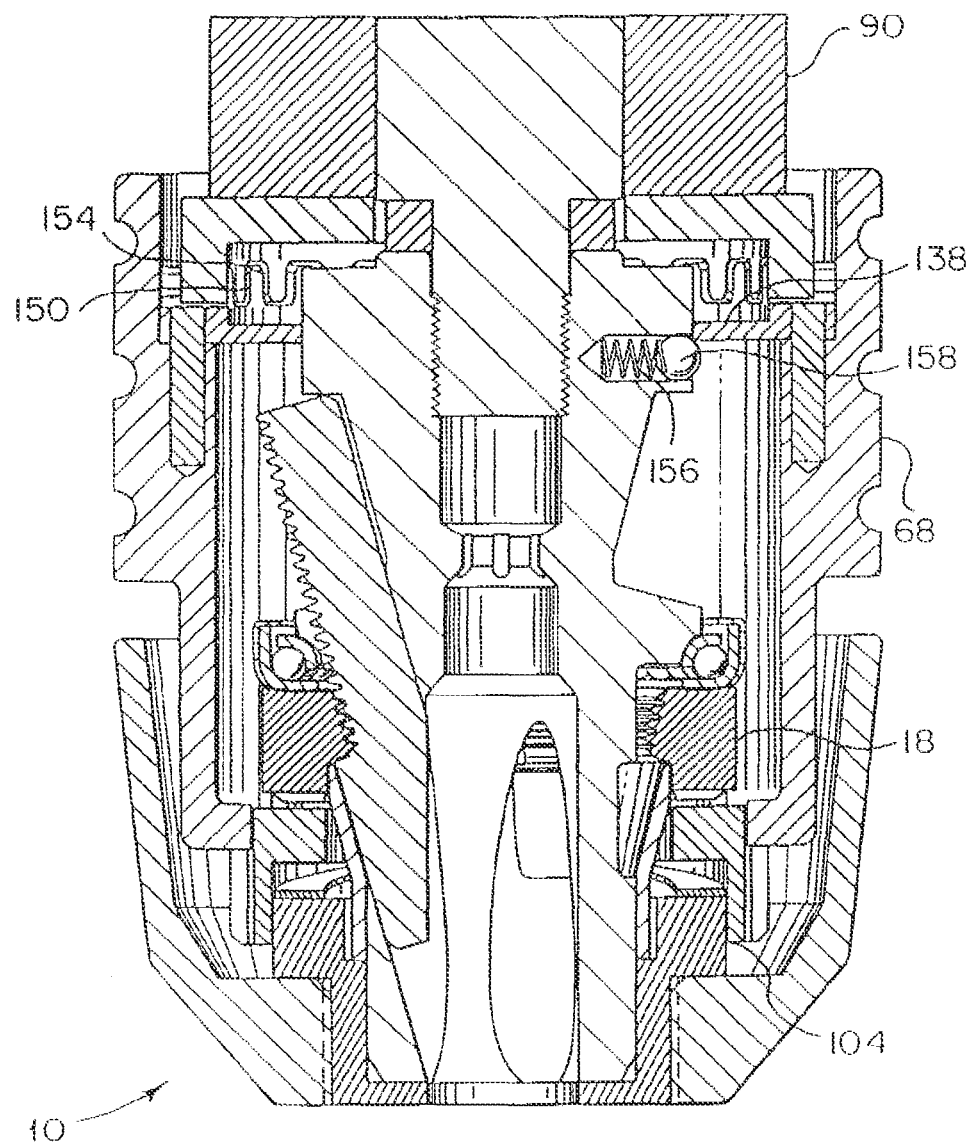
FIG. 8B is a longitudinal view, in cross section, of the chuck as in FIG. 8A.

The embodiment of chuck 10 illustrated in FIGS. 8A and 8B is constructed and operates similarly to the embodiment illustrated in FIGS. 7A and 7B, primarily except that the rear biasing spring 132 (FIGS. 6A and 6B) and rear body plate are replaced by a detent mechanism including a coil spring 156 and a ball 158. In one preferred embodiment, the detent mechanism is a self-contained mechanism that threads into body 14. A collar or other suitable stop is provided to prevent ball 158 from being pushed entirely out of the mechanism by spring 156.

Referring to FIG. 8A, rear sleeve 68 is held in the forward axial position by ball 158 bearing against rear sleeve flange 138. With rear sleeve 68 in this position, chuck 10 may be operated as a two-sleeve keyless chuck as described above with respect to FIGS. 6A and 7A.

When rear sleeve 68 is pulled rearwardly, rear sleeve flange 138 presses ball 158 downward, compressing spring 156. If sufficient rearward axial force is applied, rear sleeve 68 passes over ball 158 so that teeth 154 engage teeth 150 to rotationally hold rear sleeve 68 to housing 90, thereby rotationally holding nut 18 to housing 90 through clutch plate 104 and rear sleeve 68. Chuck 10 may then be opened or closed through activation of the drill as discussed above with respect to FIGS. 6B and 7B, except that it is not necessary for the operator to grip rear sleeve 68 during this operation. The rear sleeve is retained in the rearward axial position as shown in FIG. 8B by ball 158 bearing upon rear sleeve flange 138. Spring 156 is strong enough to hold rear sleeve 68 in the rearward axial position as shown in FIG. 8B during opening and closing of chuck 10 but yet compressible enough so that an operator may move rear sleeve 68 between the forward and rearward axial positions.

While one or more preferred embodiments of the present invention are described above, it should be appreciated that various suitable embodiments are encompassed by the present invention. For instance, in another preferred embodiment, the reciprocal locking sleeve is mounted about the chuck body and is axially movable to either of two operative positions. In the first, the locking sleeve is rotationally held to the body by opposing teeth on the sleeve and the body as at 70 and 74 in FIGS. 1 and 4 above. With the locking sleeve in this axial position, the chuck may be operated as a two-sleeve keyless chuck by relative rotation between the locking sleeve and a second sleeve rotationally held to the nut. The second sleeve may be forward of the locking sleeve. A suitable biasing mechanism may be provided to bias the locking sleeve to the first axial position.

In this axial position, the locking sleeve does not rotatably engage the nut and is therefore rotatable with respect to the nut. Opposing lugs, such as lugs 117 and 128 on clutch plate 104 and nut 18 in FIG. 9, are provided on the nut and the locking sleeve so that when the locking sleeve is moved axially into engagement with the nut, the locking sleeve is rotationally held to the nut. While an operator grips the locking sleeve, activation of the drill to rotate the drill spindle opens or closes the chuck depending upon the rotational direction of the spindle. The lugs on the locking sleeve and nut have angled sides as described above with respect to the lugs on the clutch plate and nut in FIGS. 6A and 6B, creating a clutch to prevent over tightening of the nut.

The clutching action causes the locking sleeve to move axially away from the nut. Thus, enough space is provided so that the locking mechanism between the locking sleeve and the body in the first axial position does not reengage during the clutching action. A clutch spring may be provided between the nut and the body so that the nut moves away from the locking sleeve, with respect to the body, when the nut and locking sleeve are pushed apart.

In a still further embodiment, the locking sleeve as described with respect to the previous embodiment is always rotationally held to the drill housing during the chuck's operation. The sleeve may be held in any suitable manner, for example by an axially toothed interface, so that the locking sleeve may move axially, but not rotationally, with respect to the drill housing. A spring bears on one end on the chuck body and on its other end against the locking sleeve to bias the locking sleeve away from the nut. Thus, during normal operation, the locking sleeve does not engage the nut. To open or close the chuck, an operator axially moves the locking sleeve against the spring bias to engage the nut. As above, opposing angled teeth are provided on the nut and the locking sleeve to rotationally hold them to each other. When the drill is thereafter activated to rotate the spindle, the body rotates with respect to the nut, thereby opening or closing the chuck depending on the spindle's rotational direction. When the chuck is fully opened or closed, the nut and locking sleeve are pushed apart with respect to each other, allowing the nut to again rotate with the body and thereby preventing over tightening. A clutch spring is provided between the nut and the body so that the nut moves away from the locking sleeve, with respect to the chuck body, when the nut and locking sleeve are pushed apart, thereby reducing the axial force applied to the locking sleeve opposing the operator's grip.

Furthermore, it should be understood that the identification of a "rear" sleeve in the embodiments in the figures is for illustrative purposes only. Moreover, it should be understood by those skilled in this art that the chuck components described above Ray be arranged and configured in various suitable manners within the present invention. For example, the locking and biasing mechanisms may be arranged so that the locking sleeve is pushed forward, rather than rearward to hold the nut to the drill housing. Thus, various modifications and variations to the present invention may be practiced by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is provided by way of example only, and is not intended to be limitative of the invention so further described in such appended claims.

What is claimed is:

1. A chuck for use with a manual or powered driver having a housing and a rotatable drive shaft extending therefrom, said chuck comprising:
   a. a generally cylindrical body having a nose section and a tail section, said tail section having a rear flange defining an annular shoulder and configured to mate with said drive shaft, and said nose section having an axial bore formed therein and a plurality of angularly disposed passageways intersecting said axial bore;
   b. an O-ring disposed in said annular shoulder of said rear flange;
   c. a plurality of jaws, each of said plurality of jaws slidably positioned in a respective one of said angularly disposed passageways, each of said jaws having a jaw face formed on one side thereof and threads formed on the opposite side thereof;
   d. a nut rotatably mounted on said body so that rotation of said nut moves said jaws axially within said passageways;
   e. a first sleeve;
   f. a second sleeve, and
   g. a biasing mechanism,
   wherein each of said first sleeve and said second sleeve defines a gripping surface thereon,
   wherein, in a first state, said first sleeve is rotationally held to said body and said second sleeve is rotationally held to said nut and is rotatable with respect to said housing and with respect to said body,
   wherein one of said first sleeve and said second sleeve is axially reciprocal between said first state and a second state in which said one of said first sleeve and said second sleeve is rotationally held to said nut and said housing and is rotatable with respect to said body, said one of said first sleeve and said second sleeve defines a first shoulder and a second shoulder, axial motion of said one of said first sleeve and said second sleeve being limited by abutment of said O-ring with said first and said second shoulders, and
   said biasing mechanism biasing said one of said first sleeve and said second sleeve to said first state.

2. The chuck as in claim 1, wherein said one of said first sleeve and said second sleeve is said first sleeve.

3. The chuck as in claim 2, wherein said first sleeve defines an annular groove on an inner surface thereof, an axial length of said annular groove being defined by said first shoulder and said second shoulder.

4. The chuck as in claim 3, wherein said body includes axially aligned teeth extending radially outward from an outer circumferential surface of said body, wherein said first sleeve includes axially aligned teeth extending radially inward from a circumferential surface of said first sleeve, and wherein in said first state said first sleeve teeth engage said body teeth to rotationally hold said first sleeve to said body.

5. The chuck as in claim 4, wherein said rear flange defines said outer circumferential surface of said body.

6. The chuck as in claim 1, wherein said biasing mechanism includes a spring bearing on one end against said body and on the other end on said one of said first sleeve and said second sleeve.

7. The chuck as in claim 1, including a latching mechanism configured to retain said one of said first sleeve and said second sleeve in said first state when said one of said first sleeve and said second sleeve is in said first state, and to retain said one of said first sleeve and said second sleeve in said second state when said one of said first sleeve and said second sleeve is in said second state, until application of an axial force exceeding a predetermined level.

8. The chuck as in claim 7, wherein said latching mechanism includes a detent mechanism.

9. The chuck as in claim 1, including a clutch disposed operatively between said nut and said one of said first sleeve and said second sleeve, said clutch being configured to permit relative rotation between said nut and said one of said first sleeve and said second sleeve upon application of a predetermined rotational force between said nut and said one of said first sleeve and said second sleeve.

* * * * *